J. P. LAVIGNE.
VALVE.
APPLICATION FILED JUNE 5, 1907.

942,834.

Patented Dec. 7, 1909.

WITNESSES
Clarence E. Doy
May E. Kott

INVENTOR
Joseph P. Lavigne,
By Parker W. Burton,
Attorneys.

UNITED STATES PATENT OFFICE.

JOSEPH P. LAVIGNE, OF DETROIT, MICHIGAN, ASSIGNOR TO THE LAVIGNE MANUFACTURING COMPANY, OF DETROIT, MICHIGAN.

VALVE.

942,834.   Specification of Letters Patent.   Patented Dec. 7, 1909.

Application filed June 5, 1907. Serial No. 377,300.

*To all whom it may concern:*

Be it known that I, JOSEPH P. LAVIGNE, a citizen of the United States, residing at Detroit, county of Wayne, State of Michigan, have invented a certain new and useful Improvement in Valves, and declare the following to be a full, clear, and exact description of the same, such as will enable others skilled in the art to which it pertains to make and use the same, reference being had to the accompanying drawings, which form a part of this specification.

This invention relates to valves.

It has for its object an improved quick opening valve in which the movable part is a conical structure, and is loosened in its seat preparatory to being turned therein to bring the opening through the walls of the valve into register with the opening through the walls of the diaphragm across the valve casing.

Figure 1:
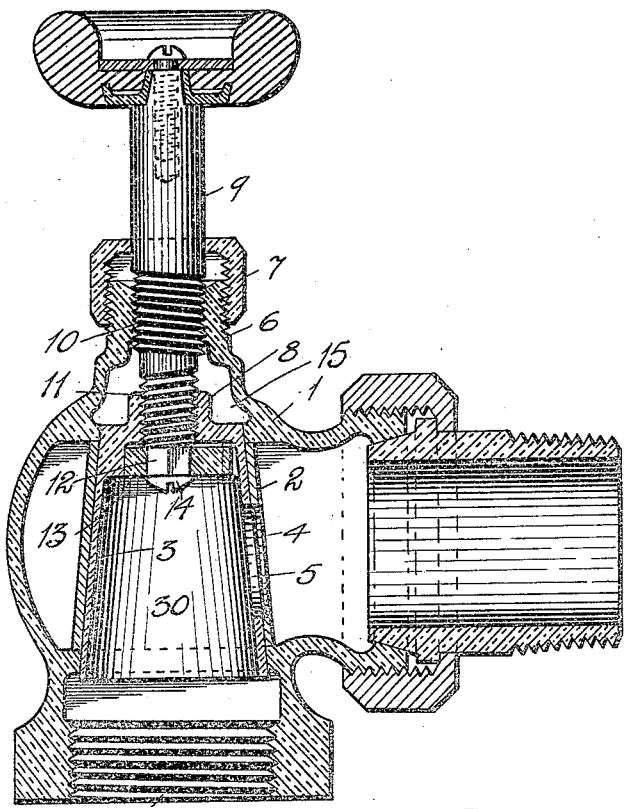
Figure 2:
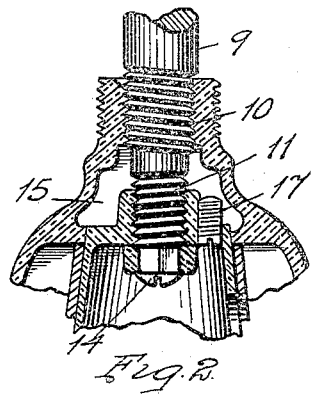
Figure 3:
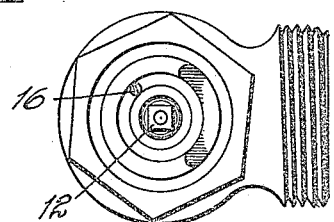
Figure 4:
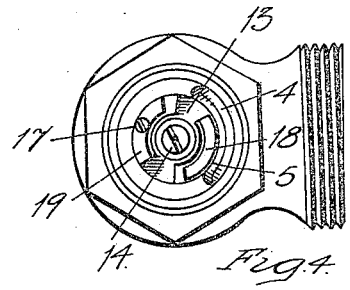

In the drawings:—Figure 1, is a sectional elevation of the entire valve. Fig. 2, is a sectional elevation of that part of the casing through which the valve stem engages; it also shows a part of the valve; this section is taken across the narrow part of the valve actuator. Fig. 3, is an end view looking into the end *a* of Fig. 1; the valve is removed. Fig. 4, is a similar end view with the valve in place.

The shell 1 is of the globe valve variety with the diaphragm 2 conical on its interior and tooled to receive the valve 30, which engages therein. A hole 4, through the diaphragm furnishes a passage for the fluid; a hole 5 through the valve at times registers with the hole through the diaphragm.

At 6 there is a neck for the passage of a valve stem, and this is properly threaded exteriorly for the packing cap 7. The neck 6 is threaded interiorly for a left-hand screw. The shell 3 of the valve proper is tooled to engage in its seat and the diaphragm across the end of the valve is provided with an extension 8, which is threaded for a left-hand thread. The stem 9 is provided with a threaded part 10 to engage in the neck of the casing, and with a threaded part 11 to engage in the extension of the valve. It is also provided near its extreme end with a rectangular terminal 12, and on which engages a valve actuator 13, held firmly in place by a holding screw 14 that runs into a threaded seat in the end of the valve stem.

Between the threaded neck of the casing and the end of the valve proper is a chamber 15 and at a proper place in this chamber is inserted a stop screw 16, that engages with a stop lug 17, on the end of the valve, in position to limit the opening movement of the valve. The closing movement of the valve on its seat is not limited except by the engagement of the valve on its seat.

The wing piece 13 has some freedom of movement or swing between the lugs 18 and 19 and allows to the stem a slight turning movement before it begins to turn the valve to open it, so that when the valve has been completely closed and it is desired to open it, the only force necessary for the preliminary movement is that which is sufficient to turn the stem in its bearings without necessarily producing any turning movement of the valve itself until the valve is pushed far enough to turn easily, and the valve has thereby been projected along its axis a sufficient distance to be clear of all frictional resistance to a further turning movement, whereupon the stem and actuator turn the shell on its axis.

What I claim is:—

In a valve, a casing, a conical valve seating therein and provided with a diaphragm across its end, a valve stem provided with right threads to engage through the neck of said casing and with left threads to engage through the diaphragm across the bottom of said valve and with a prismatic terminal within the chamber of the valve, a valve actuator engaging on said prismatic terminal, stop lugs coacting with said actuator to permit a slight turning movement of the valve stem with respect to the valve previous to the engagement of said actuator with said stop lugs, substantially as described.

In testimony whereof, I sign this specification in the presence of two witnesses.

JOSEPH P. LAVIGNE.

Witnesses:
MAY E. KOTT,
CHARLES F. BURTON.